(12) United States Patent
Dong et al.

(10) Patent No.: US 12,213,614 B2
(45) Date of Patent: Feb. 4, 2025

(54) CONTINUOUS BOILING WATER PREPARATION METHOD BASED ON GAS-LIQUID TWO-PHASE OBJECT DETECTION

(71) Applicant: Hangzhou Normal University, Hangzhou (CN)

(72) Inventors: Lida Dong, Hangzhou (CN); Wen Dong, Hangzhou (CN)

(73) Assignee: Hangzhou Normal University, Hangzhou (CN)

( * ) Notice: Subject to any disclaimer, the term of this patent is extended or adjusted under 35 U.S.C. 154(b) by 0 days.

(21) Appl. No.: 18/625,098

(22) Filed: Apr. 2, 2024

(65) Prior Publication Data

US 2024/0298836 A1  Sep. 12, 2024

Related U.S. Application Data

(63) Continuation of application No. PCT/CN2022/083938, filed on Mar. 30, 2022.

(30) Foreign Application Priority Data

Mar. 14, 2022  (CN) .......................... 202210249618.6

(51) Int. Cl.
*A47J 27/21* (2006.01)
*G01F 1/74* (2006.01)

(52) U.S. Cl.
CPC ... *A47J 27/21091* (2013.01); *A47J 27/21066* (2013.01); *A47J 27/21083* (2013.01);
(Continued)

(58) Field of Classification Search
CPC ............ A47J 27/21091; A47J 27/21066; A47J 27/21083; A47J 27/21166; A47J 2202/00; G01F 1/74
(Continued)

(56) References Cited

U.S. PATENT DOCUMENTS 5,019,690 A * 5/1991 Knepler ............. G05D 23/1912
                                                           219/400
5,422,976 A * 6/1995 Knepler ............. A47J 27/21075
                                                           126/351.1
(Continued)

FOREIGN PATENT DOCUMENTS

CN      106455846 A     2/2017
CN      107692838 A     2/2018
(Continued)

OTHER PUBLICATIONS

Internation Search Report of PCT/CN2022/083938, Mailed Dec. 14, 2022.

*Primary Examiner* — Eric S Stapleton

(57) ABSTRACT

A continuous boiling water preparation method based on gas-liquid two-phase object detection comprises a flow regulator, a heater, a temperature sensor, a two-phase object detection sensor and a controller; the flow regulator is used for injecting a cold water flow obtained from the outside into a water inlet of the heater; the heater heats up according to heating power provided by the controller; the two-phase object detection sensor and the temperature sensor are connected behind a water outlet of the heater, and when a boiling water flow flows through the two sensors, a gas-liquid ratio signal and a temperature signal are obtained respectively, and transmitted to the controller; and the controller transmits a signal indicating required heating power to the heater or transmits a signal indicating a required flow value to the flow regulator through calculation to execute output after receiving the gas-liquid ratio signal.

3 Claims, 3 Drawing Sheets

(52) U.S. Cl.
CPC ........... *A47J 27/21166* (2013.01); *G01F 1/74* (2013.01); *A47J 2202/00* (2013.01)

(58) Field of Classification Search
USPC ........................................................ 392/451
See application file for complete search history.

(56) References Cited

U.S. PATENT DOCUMENTS

| | | | | |
|---|---|---|---|---|
| 8,820,175 | B1* | 9/2014 | Ahmed | ................... G01F 1/688 |
| | | | | 73/861.04 |
| 9,702,745 | B2* | 7/2017 | Schüller | ................ G01F 1/6847 |
| 2014/0356236 | A1* | 12/2014 | Yamakaji | ........... B01D 53/9431 |
| | | | | 422/111 |

FOREIGN PATENT DOCUMENTS

| CN | 109099589 | A | 12/2018 |
|---|---|---|---|
| CN | 109142436 | A | 1/2019 |
| GB | 1391064 | A | 4/1975 |
| JP | 2814744 | B2 | 10/1998 |
| JP | 2012239969 | A | 12/2012 |
| RU | 0002272358 | C1 | 1/2006 |
| WO | 2015177434 | A1 | 11/2015 |

* cited by examiner

CONTINUOUS BOILING WATER PREPARATION METHOD BASED ON GAS-LIQUID TWO-PHASE OBJECT DETECTION

CROSS-REFERENCE TO RELATED APPLICATIONS

This application is a continuation of International Patent Application No. PCT/CN2022/083938 with a filing date of Mar. 30, 2022, designating the United States, and further claims priority to Chinese Patent Application No. 202210249618.6 with a filing date of Mar. 14, 2022. The content of the aforementioned applications, including any intervening amendments thereto, are incorporated herein by reference.

TECHNICAL FIELD

The present invention generally relates to an instant or quick heating water dispenser. The present invention provides a continuous boiling water preparation method based on gas-liquid two-phase object detection. More particularly, the present invention relates to a continuous boiling water preparation method for an instant or quick heating water dispenser.

BACKGROUND OF THE PRESENT INVENTION

An instant or quick heating water dispenser is a safe, environment-friendly and fast instant boiling and heating water dispenser, which is characterized by: instant heating without waiting; standby without power consumption, and energy and electricity saving; the solution of stagnant water, boiling water and other problems; and a small size, a fashionable appearance, space saving, and the like.

Generally, a working principle of the instant or quick heating water dispenser is to control a flow regulator to work by using a control module, continuously inject cold water into a heater, and turn on, by the control module, the heater to play the heating role at the same time, so that the cold water is heated while flowing through the heater, and hot water flows out of a pipeline. Hot water preparation usually comprises the following steps of: detecting whether there is water in the pipeline of the water dispenser; when the pipeline is in a state of water shortage, turning on the flow regulator to inject water first until the flow regulator is full, and then turning on the heater; and taking a detected value of an outlet water temperature as a feedback quantity, and realizing the continuous preparation of hot water at a required temperature by a closed-loop control heater or the flow regulator.

A maximum temperature of hot water capable of being continuously prepared by the instant or quick heating water dispenser is generally 1° C. to 5° C. lower than the boiling point temperature, so that there is still a gap in continuous preparation of real boiling water. The fundamental reason is that the boiling water is substantially a gas-liquid two-phase object, a physical temperature of the boiling water is constant at the boiling point, only a constant boiling point temperature can be detected when detected by a temperature sensor, and the whole closed-loop control will lose stability when this temperature signal serves as the feedback quantity for the continuous boiling water preparation, so that the instant or quick heating water dispenser cannot realize continuous and stable boiling water preparation.

In order to solve the above defects, the present invention discloses a continuous boiling water preparation method based on gas-liquid two-phase object detection, which uses a mixing ratio of a gas-liquid two-phase object generated when water is detected at the boiling point as the feedback quantity, and achieves the purpose of continuous and stable boiling water preparation by closed-loop feedback control. The so-called gas-liquid two-phase object refers to gas, liquid or a gas-liquid coexisting object, wherein the gas may be gaseous water or air, the liquid is liquid water, and the gas-liquid coexisting object is a substance in which the gas and the liquid exist at the same time. The mixing ratio of the gas-liquid two-phase object (abbreviated as the gas-liquid ratio) is liquid volume/(gas volume+liquid volume).

SUMMARY OF THE PRESENT INVENTION

The present invention is intended to provide a continuous boiling water preparation device and method based on gas-liquid two-phase object detection aiming at the defects in the prior art. According to the present invention, an instant or quick heating water dispenser and the like can realize continuous preparation of real boiling water by using the continuous boiling water preparation method.

The technical solution used in the present invention to solve the technical problem is as follows:

The present invention comprises five core functional units: a flow regulator 1, a heater 2, a temperature sensor 4, a two-phase object detection sensor 5 and a controller 3. As shown in FIG. 1, the core functional units may be applied to the water dispenser in the form of discrete devices, discrete units or an integrated module, and are physically connected through liquid pipelines and electrical circuits (referring to FIG. 3). In one embodiment of the water dispenser of the present invention, the functional units coexist in the form of discrete devices, discrete units or an integrated module, as shown in FIG. 3.

Controlled objects of the continuous boiling water preparation method may be the heater 2 and the flow regulator 1. Preferably, the heater 2 or the flow regulator 1 serves as a single controlled object. When the heater 2 is selected as the controlled object, the continuous boiling water preparation method is called as a heating-control-type continuous boiling water preparation method and abbreviated as a heat-control preparation method; and when the flow regulator 1 is selected as the controlled object, the continuous boiling water preparation method is called as a flow-control-type continuous boiling water preparation method and abbreviated as a flow-control preparation method.

A working principle of the heating-control-type continuous boiling water preparation method is as shown in FIG. 2A: the flow regulator 1 is used for continuously obtaining a stable cold water flow from the outside of the device and injecting the cold water flow into a water inlet of the heater; the heater 2 heats up according to heating power provided by the controller, so that the water flow flowing through an interior of the heater is gradually heated until a water outlet of the heater obtains a continuous gas-liquid two-phase flow in a boiling state (a boiling water flow); the two-phase object detection sensor 5 and the temperature sensor 4 are connected behind the water outlet of the heater 2, and when the boiling water flow flows through the two-phase object detection sensor 5 and the temperature sensor 4, a gas-liquid ratio signal and a temperature signal are obtained respectively, and transmitted to the controller 3A; and the controller 3A calculates required heating power through a closed-loop feedback control strategy, and transmits a signal indicating the required heating power to the heater 2 through calculation to execute output after receiving the gas-liquid ratio signal. The temperature signal received by the controller 3A is mainly used for monitoring a temperature state of the boiling water flow, and may also be used for correcting the gas-liquid ratio signal.

The heat controller has the following functions: a gas-liquid ratio signal and temperature signal sampling function, a closed-loop control calculation function, a heat power drive output function, a flow drive output function and a safety protection function. The closed-loop feedback control strategy is used to calculate the heating power, which can be realized by a PID as follows:

$$u_1(t) = K_{1,p}\left(e_1(t) + \frac{1}{T_{1,I}}\int_0^t e_1(t)dt + T_{1,D}\frac{de_1(t)}{dt}\right) \quad (1)$$

wherein, $u_1(t)$ is an output quantity of the controller of the heat-control preparation method, that is, a control quantity of the heating power, $K_{1,p}$ is a gain coefficient of the controller, $T_{1,I}$ is an integral time constant of the controller, $T_{1,D}$ is a derivative time constant of the controller, and $e_1(t)$ is a deviation between a reference signal and a feedback signal.

A working principle of the flow-control-type continuous boiling water preparation method is as shown in FIG. 2B: the flow regulator 1 continuously obtains required cold water flow from the outside of the device according to a flow value provided by the controller 3B and injects the cold water flow into a water inlet of the heater 2; the heater 2 heats up according to constant heating power, so that the water flow flowing through an interior of the heater is gradually heated until a water outlet end of the heater obtains a continuous gas-liquid two-phase (boiling water) flow in a boiling state; the two-phase object detection sensor 5 and the temperature sensor 4 are connected behind the water outlet of the heater 2, and when the boiling water flow flows through the two-phase object detection sensor 5 and the temperature sensor 4, a gas-liquid ratio signal and a temperature signal are obtained respectively, and transmitted to the controller 3B; and the controller 3B calculates a required flow value through a closed-loop feedback control strategy, and transmits a signal indicating the required flow value to the flow regulator 1 through calculation to execute output after receiving the gas-liquid ratio signal. The temperature signal received by the controller 3B is mainly used for monitoring a temperature state of the boiling water flow, and may also be used for correcting the gas-liquid ratio signal.

The flow controller has the following functions: a gas-liquid ratio signal and temperature signal sampling function, a closed-loop control calculation function, a heat power drive output function, a flow drive output function and a safety protection function. The closed-loop feedback control strategy is used to calculate the required flow value, which can be realized by a PID as follows:

$$u_2(t) = K_{2,p}\left(e_2(t) + \frac{1}{T_{2,I}}\int_0^t e_2(t)dt + T_{2,D}\frac{de_2(t)}{dt}\right) \quad (2)$$

wherein, $u_2(t)$ is an output quantity of the controller of the flow-control preparation method, that is, a control quantity of the flow regulator, $K_{2,p}$ is a gain coefficient of the controller, $T_{2,I}$ is an integral time constant of the controller, $T_{2,D}$ is a derivative time constant of the controller, and $e_2(t)$ is a deviation between a reference signal and a feedback signal.

The two-phase object detection sensor 5 can detect the gas-liquid two-phase flow (the boiling water flow) statically remains in or dynamically flow through a pipeline of the water dispenser in real time. An output electrical signal of the two-phase object detection sensor 5 has a positive or negative correlation with the gas-liquid ratio. The positive correlation refers to a minimum output signal at a gas-liquid ratio of 0 and a maximum output signal at a gas-liquid ratio of 1; and the negative correlation is on the contrary.

The two-phase object detection sensor may be made according to an optical principle or a capacitance principle.

Preferably, the two-phase object detection sensor of the present invention is made as follows:

the gas-liquid two-phase object detection sensor 5 of the present invention is composed of four core components: a light emitter 5-1, a light-transmitting circular pipe 5-2, a convex lens 5-3 and a photosensitive detector 5-4. The four core components may be fixed in independent structural components or non-independent structural components, but the four components all need to be aligned and mounted along an optical axis during fixing. In one embodiment of the present invention, all components of the detection sensor are mounted in the independent structural components.

The light-transmitting circular pipe 5-2 is connected with a pipeline of the water dispenser, so that the gas-liquid two-phase object of the water dispenser statically remains in or dynamically flows through the light-transmitting circular pipe 5-2; and a light beam from the light emitter 5-1 enters the light-transmitting circular pipe 5-2, and forms a strip-shaped light beam through a condensing action of a cylindrical lens, and then the strip-shaped light beam forms a spot-shaped light beam through a condensing action of the convex lens 5-3, and finally reaches the photosensitive detector 5-4 and is converted into an output electric signal.

Further, according to different types of boiling water preparation methods, the controller 3 in the present invention is divided into two types (as shown in FIG. 2): a controller suitable for the heating-control-type continuous boiling water preparation method, which is called as the heat controller 3A (that is, a heating-type controller); and a controller suitable for the flow-control-type continuous boiling water preparation method, which is called as the flow controller 3B (that is, a flow-type controller). The two controllers have basically the same functions, mainly comprising: a gas-liquid ratio signal and temperature signal sampling unit, a closed-loop control calculation unit, a heat power drive output unit and a flow drive output unit. There is a main difference that: an output of the heat power drive output unit of the heat controller 3A does not need to be continuously adjustable, while an output of the flow drive output unit of the flow controller 3B needs to be continuously adjustable.

Further, the heater 2 is a heating component of the continuous boiling water preparation method, which may be a heating pipe made by a glass coating process or a stainless steel coating process, or an internal-heat-type heating pipe. When the heat-control preparation method is adopted, the heating power of the heater 2 needs to be continuously adjustable; and when the flow-control preparation method is adopted, the heating power of the heater 2 may be constant or adjustable.

Further, the flow regulator 1 is a water flow provider of the continuous boiling water preparation method. When the heat-control preparation method is adopted, a flow of the flow regulator 1 may be constant or adjustable; and when the flow-control preparation method is adopted, the flow of the flow regulator 1 is required to be continuously adjustable. When there is no external pressure to supply water, a self-suction water pump (such as a diaphragm pump or a peristaltic pump) may be used as the flow regulator; and when there is external pressure to supply water, a valve and the like may be used as the flow regulator. In order to reduce performance requirements of the flow regulator, the flow regulator is usually mounted at a cold water inlet end.

Models of the heater comprise ALD-2023, CT2GYSJ-2C2GYSJ-2, and the like. Models of the flow regulator comprise JYPDM-1, LG39-12, and the like.

The present invention has the beneficial effects that: the gas-liquid ratio signal serves as the closed-loop feedback signal for continuous boiling water preparation, which can overcome the problem that the closed-loop control system of the quick heating water dispenser is easy to lose stability, so that the boiling water is continuously and stably prepared, with the advantage that real boiling water is provided to a user on the basis of retaining the advantages of current rapid-heating water dispensers.

DETAILED DESCRIPTION OF PREFERRED EMBODIMENTS

Figure 1:
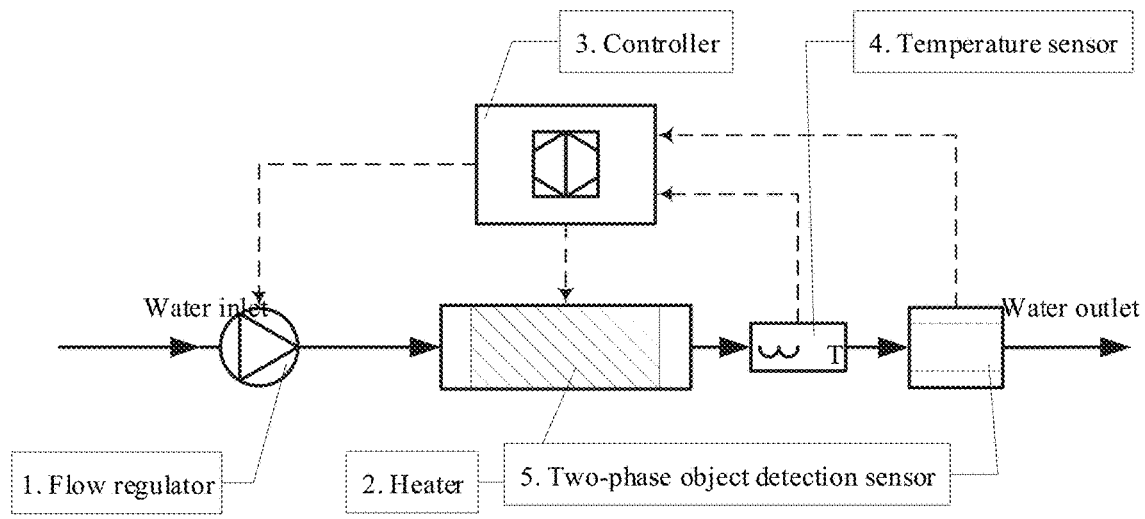
FIG. 1 is a schematic diagram of composition of a continuous boiling water preparation method, which illustrates various functional units of the continuous boiling water preparation method and functional connection relationships among the functional units.

An essence and an operation mode of the present invention will be described more comprehensively in the following specific embodiments of the present invention with reference to the drawings.

The present invention discloses a continuous boiling water preparation method based on gas-liquid two-phase object detection, and the method may be used in an instant or quick heating water dispenser to realize continuous boiling water preparation. The method is composed of five core functional units: a flow regulator 1, a heater 2, a temperature sensor 4, a two-phase object detection sensor 5 and a controller 3. According to different controlled objects, the continuous boiling water preparation method may be divided into two types: a heating-control-type continuous boiling water preparation method (abbreviated as a heat-control preparation method) and a flow-control-type continuous boiling water preparation method (abbreviated as a flow-control preparation method). The heat-control preparation method is applicable to the case in which the controlled object is the heater 2, and the flow-control preparation method is applicable to the case in which the controlled object is the flow regulator 1. A working principle of the heat-control preparation method is that: the flow regulator 1 is used for continuously obtaining a stable cold water flow from the outside of the device and injecting the cold water flow into a water inlet of the heater; the heater 2 heats up according to heating power provided by the controller, so that the water flow flowing through an interior of the heater is gradually heated until a water outlet of the heater obtains a continuous gas-liquid two-phase (boiling water) flow in a boiling state; the temperature sensor 4 and the two-phase object detection sensor 5 are connected behind the water outlet of the heater 2, and when the boiling water flow flows through these sensors, a gas-liquid ratio signal and a temperature signal are obtained, and transmitted to the controller 3; and the controller 3 calculates required heating power through a closed-loop feedback control strategy, and transmits the required heating power to the heater 2 through calculation to execute output after receiving the gas-liquid ratio signal. The temperature signal received by the controller 3 is mainly used for monitoring a temperature state of the boiling water flow, and may also be used for correcting the gas-liquid ratio signal. A principle of the flow-control preparation method is basically the same as the principle of the heat-control preparation method, except that a water supply flow of the flow regulator 1 is under closed-loop control of the controller 3, while the heating power of the heater 2 is constant.

Embodiment 1

FIG. 1 shows a case of composition of functional units of a continuous boiling water preparation method and functional connection relationships among the functional units. In this case, the continuous boiling water preparation method is composed of five functional units: a flow regulator 1, a heater 2, a controller 3, a temperature sensor 4 and a two-phase object detection sensor 5. By pipeline connection, a liquid will flow through the flow regulator 1, the heater 2, the temperature sensor 4 and the two-phase object detection sensor 5 in sequence, wherein a liquid pipeline connection part is indicated by a directional heavy line, and a liquid flow direction is indicated by an arrow direction. By electrical connection, the controller 3 acquires a gas-liquid ratio signal from the two-phase object detection sensor 5 and a gas-liquid mixture temperature signal from the temperature sensor 4, and sends a heating control signal to the heater 2 or a flow control signal to the flow regulator 1, wherein the electrical connection is indicated by a directional dotted line, and a signal or electric energy flow direction is indicated by an arrow direction. FIG. 1 shows the continuous boiling water preparation method, which covers a heat-control preparation method and a flow-control preparation method.

Embodiment 2

Figure 2A:
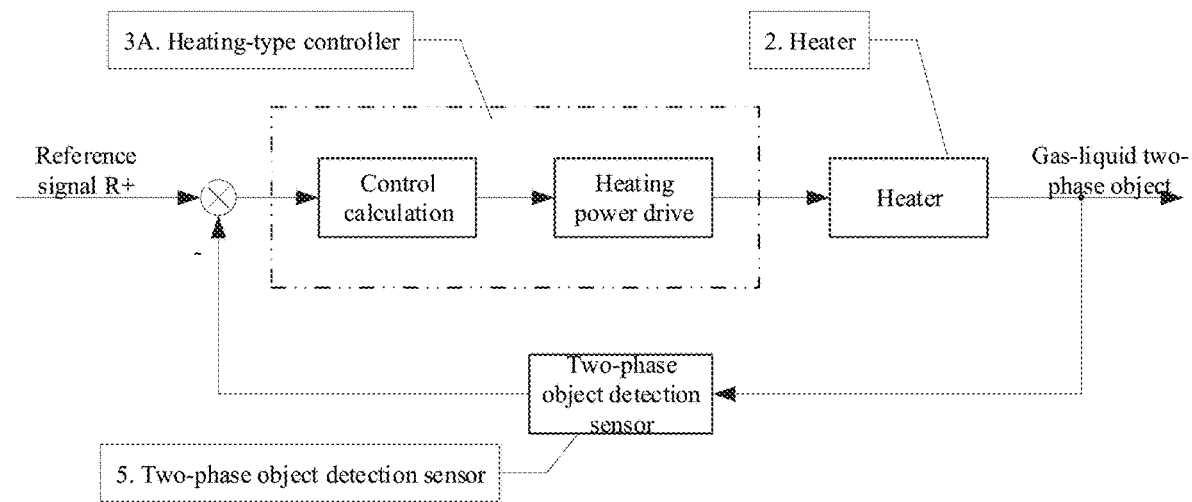
FIG. 2A is a schematic diagram of a working principle of a heat-control preparation method.

FIG. 2A shows a working principle of a heat-control preparation method, and FIG. 2A shows that core components required for closed-loop control of the heat-control preparation method are a heat controller 3A, a heater 2 and a two-phase object detection sensor 5. After obtaining a gas-liquid ratio signal from the two-phase object detection sensor 5, the heat controller 3A compares the gas-liquid ratio signal with a reference signal set in the heat controller 3A to obtain a deviation, then calculates a control signal through a closed-loop control calculation unit, and outputs the control signal subjected to power amplification by a heating power driver in a heat power drive output unit to the heater 2, so as to realize real-time continuous regulation of heating power, and finally realize continuous boiling water preparation.

The closed-loop control calculation unit in the heat controller 3A adopts conventional control algorithms such as PID control given in Formula (1) for closed-loop control calculation. The heat power drive output unit adopts electric drive. The heat controller 3A collects the gas-liquid ratio signal and a temperature signal through a gas-liquid ratio signal and temperature signal sampling unit, wherein the temperature signal is used for monitoring a temperature state of a boiling water flow, or is convenient for improvement and subsequent correction of the gas-liquid ratio signal.

Embodiment 3

Figure 2B:
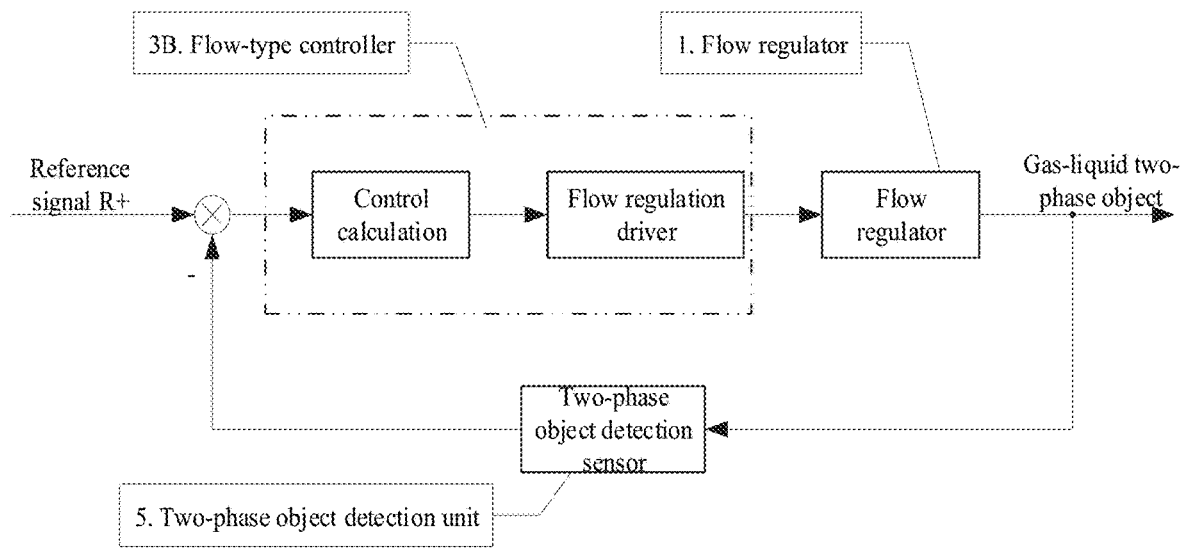
FIG. 2B is a schematic diagram of a working principle of a flow-control preparation method.

FIG. 2B shows that core components required for closed-loop control of the flow-control preparation method are a flow controller 3B, a flow regulator 1 and a two-phase object detection sensor 5. After obtaining a gas-liquid ratio signal from the two-phase object detection sensor 5, the flow controller 3B comparing the gas-liquid ratio signal with a reference signal set in the flow controller 3B to obtain a deviation, then calculates a control signal through a closed-loop control calculation unit, and outputs the control signal subjected to power amplification by a flow regulation driver in a flow drive output unit to the flow regulator 1, so as to realize real-time continuous regulation of the water flow, and finally realize continuous boiling water preparation.

Further, the closed-loop control calculation unit in the flow controller 3B adopts conventional control algorithms such as PID control and fuzzy control given in Formula (2) for closed-loop control calculation. The flow drive output unit adopts electric drive. The flow controller 3B collects the gas-liquid ratio signal and a temperature signal through a gas-liquid ratio signal and temperature signal sampling unit, wherein the temperature signal is used for monitoring a temperature state of a boiling water flow, or is convenient for improvement and subsequent correction of the gas-liquid ratio signal.

Embodiment 4

Figure 3:
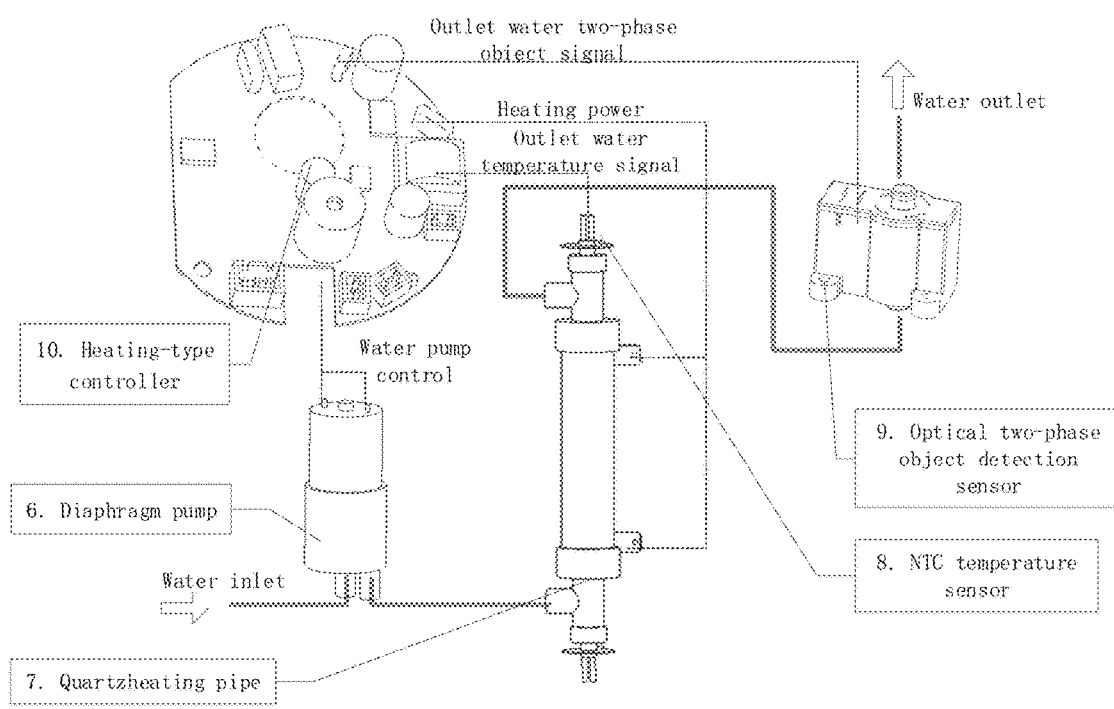
FIG. 3 shows an application case of the heat-control preparation method in a water dispenser.

FIG. 3 shows an application case of a heat-control preparation method in a water dispenser.

In this case, main functional components of the water dispenser are: a diaphragm pump 6, a quartz heating pipe 7, an NTC temperature sensor 8, an optical two-phase object detection sensor 9, a heating-type controller 10, and the like. The diaphragm pump 6 realizes a function of a flow regulator, the quartz heating pipe 7 realizes a heating function of cold water in the pipe, the NTC temperature sensor 8 is used for detecting an outlet water temperature, the optical two-phase object detection sensor 9 is used for detecting a gas-liquid ratio of outlet water, and the heating-type controller 10 is a control unit of the water dispenser. Main functional components of the water dispenser are physically connected through liquid pipelines represented by heavy lines and electrical circuits represented by dotted lines.

The water dispenser is usually in a state of waiting for an instruction of a user after being electrified. When the user gives an instruction of supplying water to the water dispenser, the heating-type controller 10 turns on the diaphragm pump 6 to work first, and receives a gas-liquid ratio signal of the optical two-phase object detection sensor 9 and an outlet water temperature signal of the NTC temperature sensor 8. The heating-type controller 10 carries out a control operation through the closed-loop control calculation unit, and an operation result acts on the quartz heating pipe 7, so as to stabilize outlet water in a boiling state specified by the user.

Further, during boiling water preparation, when the signal of the optical two-phase object detection sensor 9 indicates that a liquid content of a gas-liquid two-phase object is lower than a set threshold, it is indicated that the water dispenser is short of water or subjected to serious water gasification, and the heating-type controller 10 will control the safety of the diaphragm pump 6 and the quartz heating pipe 7, so as to realize safety protection, fault alarm and other operations of the water dispenser.

Further, mounting positions of the quartz heating pipe 7, the NTC temperature sensor 8 and the optical two-phase object detection sensor 9 may satisfy that: the NTC temperature sensor 8 is mounted at a water outlet of the quartz heating pipe 7, and a distance is within a set threshold range I, so as to ensure that a time delay of the temperature signal is as small as possible; and the optical two-phase object detection sensor 9 is mounted at a back end of the NTC temperature sensor 8, and a distance is also within a set threshold range II, so as to ensure that a time delay of the gas-liquid ratio signal is as small as possible. When the quartz heating pipe 7 and the optical two-phase object detection sensor 9 are mounted, water flows in interiors of the quartz heating pipe and the optical two-phase object detection sensor are upwardly vertical to the ground.

Embodiment 5

Figure 4:
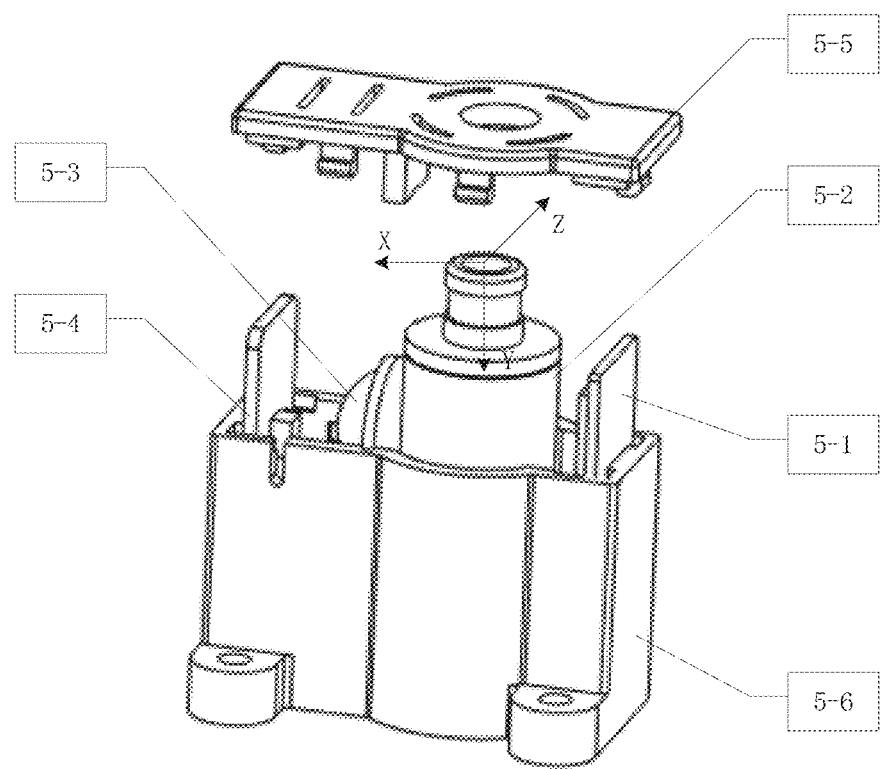
FIG. 4 is an example diagram of internal assembly of a detection sensor, which shows assembly relationships among various components of the detection sensor.

As shown in FIG. 4, a gas-liquid two-phase object detection sensor 5 of the present invention is composed of four core components: a light emitter 5-1, a light-transmitting circular pipe 5-2, a convex lens 5-3, a photosensitive detector 5-4 and a mounting box body 5-6. The four core components may be fixed in independent structural components or non-independent structural components, but the four components all need to be aligned and mounted along an optical axis during fixing. In one embodiment of the present invention, all components of the detection sensor are mounted in the independent structural components, that is, the components are mounted in the mounting box body 5-6 and then fixed by a mounting cover plate 5-5, and the mounting cover plate 5-5 and the mounting box body 5-6 may be connected and fixed by a locking structure. The components are the light emitter 5-1, the light-transmitting circular pipe 5-2, the convex lens 5-3 and the photosensitive detector 5-4 from right to left during assembly. The mounting cover plate on the mounting box and the mounting box body are provided with heat dissipation holes. The mounting cover plate on the mounting box and the mounting box body may both be made of a non-transparent material.

The light-transmitting circular pipe 5-2 is connected with a pipeline of the water dispenser, so that the gas-liquid two-phase object of the water dispenser statically remains in or dynamically flows through the light-transmitting circular pipe 5-2; and a light beam from the light emitter 5-1 enters the light-transmitting circular pipe 5-2, and forms a strip-shaped light beam through a condensing action of a cylindrical lens, and then the strip-shaped light beam forms a spot-shaped light beam through a condensing action of the convex lens 5-3, and finally reaches the photosensitive detector 5-4 and is converted into an output electric signal.

Further, an assembly relationship between the light emitter 5-1 and the light-transmitting circular pipe 5-2 should satisfy that: a point-type luminous body array of the light emitter 5-1 is parallel to an axis of the light-transmitting circular pipe 5-2; and a center line of a light beam may be perpendicular to an axis of the light-transmitting circular pipe 5-2.

Further, an assembly relationship between the light-transmitting circular pipe 5-2 and the convex lens 5-3 should satisfy that: an optical axis of a strip-shaped light beam generated by the light-transmitting circular pipe 5-2 may be aligned with an optical axis of the convex lens 5-3.

Further, an assembly relationship between the convex lens 5-3 and the photosensitive detector 5-4 should satisfy that: an irradiation range of a spot-shaped light beam generated in a focal area of the convex lens 5-3 covers a photosensitive device of the photosensitive detector.

Obviously, those skilled in the art may make various modifications and variations to the present invention without departing from the spirit and scope of the present invention. It should be noted that the above are only specific embodiments of the present invention, and do not limit the present invention, and any modulation and optimization made within the spirit and principle of the present invention should be covered by the claims of the present invention.

We claim:

1. A continuous boiling water preparation method based on gas-liquid two-phase object detection, comprising the following steps of:
    step 1: continuously obtaining a cold water flow from an outside of a device by using a flow regulator (1), and injecting the cold water flow into a water inlet of a heater;
    step 2: making the heater (2) heat up according to heating power provided by a heat controller (3A), so that the water flow flowing through an interior of the heater is heated until a water outlet of the heater obtains a continuous gas-liquid two-phase flow in a boiling state;
    step 3: by connecting a two-phase object detection sensor (5) and a temperature sensor (4) behind the water outlet of the heater (2), obtaining a gas-liquid ratio signal and a temperature signal respectively, and transmitting the signals to the heat controller (3A); and
    step 4: comparing, by the heat controller (3A), the received gas-liquid ratio signal with a reference signal set in the heat controller (3A) to obtain a deviation, then calculating a control signal, and outputting the control signal subjected to power amplification by a heating power driver to the heater (2), so as to realize real-time continuous regulation of the heating power, and finally realize continuous boiling water preparation; wherein,
    during boiling water preparation, when the signal of the two-phase object detection sensor indicates that a liquid content of a gas-liquid two-phase object is lower than a set threshold, it is indicated that a water dispenser is short of water or subjected to water gasification, and the heat controller (3A) regulates the heater (2) and the flow regulator (1);
    mounting positions of the heater (2), the temperature sensor (4) and the two-phase object detection sensor (5) satisfy that: the temperature sensor (4) is mounted at the water outlet of the heater (2), and a mounting distance is within a set threshold range I; the two-phase object detection sensor (5) is mounted at a back end of the temperature sensor (4), and a mounting distance is also within a set threshold range II; and when the heater (2) and the two-phase object detection sensor (5) are mounted, water flows in interiors of the heater and the two-phase object detection sensor are upwardly vertical to a ground;
    the two-phase object detection sensor (5) is composed of four core components: a light emitter (5-1), a light-transmitting circular pipe (5-2), a convex lens (5-3) and a photosensitive detector (5-4); and the four core components are fixed in a mounting box body, and the light emitter (5-1), the light-transmitting circular pipe (5-2), the convex lens (5-3) and the photosensitive detector (5-4) are from right to left during assembly; and
    the light-transmitting circular pipe (5-2) is connected with a pipeline of the water dispenser, so that the gas-liquid two-phase object of the water dispenser statically remains in or dynamically flows through the light-transmitting circular pipe (5-2); and a light beam from the light emitter (5-1) enters the light-transmitting circular pipe (5-2), and forms a strip-shaped light beam through a condensing action of a cylindrical lens, and then the strip-shaped light beam forms a spot-shaped light beam through a condensing action of the convex lens (5-3), and finally reaches the photosensitive detector (5-4) and is converted into an output electric signal.

2. Another continuous boiling water preparation method based on gas-liquid two-phase object detection, comprising the following steps of:
    step 1: continuously obtaining a cold water flow from an outside of a device by using a flow regulator (1), and injecting the cold water flow into a water inlet of a heater;
    step 2: making the heater (2) heat up according to heating power provided by a flow controller (3B), so that the water flow flowing through an interior of the heater is heated until a water outlet of the heater obtains a continuous gas-liquid two-phase flow in a boiling state;
    step 3: by connecting a two-phase object detection sensor (5) and a temperature sensor (4) behind the water outlet of the heater (2), obtaining a gas-liquid ratio signal and a temperature signal respectively, and transmitting the signals to the flow controller (3B); and
    step 4: comparing, by the flow controller (3B), the received gas-liquid ratio signal with a reference signal set in the flow controller (3B) to obtain a deviation, then calculating a control signal, and outputting the control signal subjected to power amplification by a flow regulation driver to the flow regulator (1), so as to realize real-time continuous regulation of the water flow, and finally realize continuous boiling water preparation; wherein,
    during boiling water preparation, when the signal of the two-phase object detection sensor indicates that a liquid content of a gas-liquid two-phase object is lower than a set threshold, it is indicated that the water dispenser is short of water or subjected to serious-water gasification, and the heat controller (3A) regulates the heater (2) and the flow regulator (1);
    mounting positions of the heater (2), the temperature sensor (4) and the two-phase object detection sensor (5) satisfy that: the temperature sensor (4) is mounted at the water outlet of the heater (2), and a mounting distance is within a set threshold range I; the two-phase object detection sensor (5) is mounted at a back end of the temperature sensor (4), and a mounting distance is also within a set threshold range II; and when the heater (2) and the two-phase object detection sensor (5) are mounted, water flows in interiors of the heater and the two-phase object detection sensor are upwardly vertical to a ground;
    the two-phase object detection sensor (5) is composed of four core components: a light emitter (5-1), a light-transmitting circular pipe (5-2), a convex lens (5-3) and a photosensitive detector (5-4); and the four core components are fixed in a mounting box body, and the light emitter (5-1), the light-transmitting circular pipe (5-2), the convex lens (5-3) and the photosensitive detector (5-4) are from right to left during assembly; and the light-transmitting circular pipe (5-2) is connected with a pipeline of the water dispenser, so that the gas-liquid two-phase object of the water dispenser statically remains in or dynamically flows through the light-transmitting circular pipe (5-2); and a light beam from the light emitter (5-1) enters the light-transmitting circular pipe (5-2), and forms a strip-shaped light beam through a condensing action of a cylindrical lens, and then the strip-shaped light beam forms a spot-shaped light beam through a condensing action of the convex lens (5-3), and finally reaches the photosensitive detector (5-4) and is converted into an output electric signal.

3. The continuous boiling water preparation method based on gas-liquid two-phase object detection according to claim 1 or 2, wherein a system used in the method comprises the flow regulator (1), the heater (2), the temperature sensor (4), the two-phase object detection sensor (5) and the controller (3), wherein the flow regulator (1) is used for continuously obtaining the cold water flow from the outside and injecting the cold water flow into the water inlet of the heater (2); the heater (2) heats up according to the heating power provided by the controller (3), so that the water flow flowing through an interior of the heater is heated until the water outlet of the heater obtains a continuous boiling water flow in a boiling state; the two-phase object detection sensor (5) and the temperature sensor (4) are connected behind the water outlet of the heater (2), and when the boiling water flow flows through the two-phase object detection sensor (5) and the temperature sensor (4), the gas-liquid ratio signal and the temperature signal are obtained respectively, and transmitted to the controller (3); and the controller (3) transmits a signal indicating required heating power to the heater (2) or transmits a signal indicating a required flow value to the flow regulator (1) through calculation to execute output after receiving the gas-liquid ratio signal, and the system uses a mixing ratio of the gas-liquid two-phase object generated when detected water is at a boiling point as a feedback quantity, and achieves a purpose of continuous boiling water preparation by closed-loop feedback control.

* * * * *